(12) United States Patent
Khutorsky et al.

(10) Patent No.: US 10,961,599 B2
(45) Date of Patent: Mar. 30, 2021

(54) LIGHTWEIGHT DOOR BEAM, COMPOSITION THEREOF AND METHOD OF MANUFACTURING THE SAME

(71) Applicants: Hyundai America Technical Center, Inc, Superior Township, MI (US); Hyundai Motor Company, Seoul (KR); Kia Motors Corporation, Seoul (KR)

(72) Inventors: Alex Khutorsky, Sylvania, OH (US); Jonghyun Kim, Ann Arbor, MI (US)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 150 days.

(21) Appl. No.: 15/215,324

(22) Filed: Jul. 20, 2016

(65) Prior Publication Data
US 2018/0023156 A1  Jan. 25, 2018

(51) Int. Cl.
| | | |
|---|---|---|
| *C21D 9/08* | (2006.01) | |
| *C21D 1/42* | (2006.01) | |
| *C22C 38/32* | (2006.01) | |
| *B60J 5/04* | (2006.01) | |
| *C21D 6/00* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |

(Continued)

(52) U.S. Cl.
CPC .............. *C21D 9/08* (2013.01); *B60J 5/0444* (2013.01); *B60J 5/0456* (2013.01); *C21D 1/42* (2013.01); *C21D 6/002* (2013.01); *C21D 6/005* (2013.01); *C21D 6/008* (2013.01); *C22C 38/002* (2013.01); *C22C 38/02* (2013.01); *C22C 38/04* (2013.01); *C22C 38/06* (2013.01); *C22C 38/22* (2013.01); *C22C 38/28* (2013.01); *C22C 38/32* (2013.01); *B60J 5/0443* (2013.01); *Y02P 10/25* (2015.11)

(58) Field of Classification Search
CPC ... C21D 1/10; C21D 1/18; C21D 1/42; C21D 6/002; C21D 6/005; C21D 6/008; C21D 9/08; C21D 9/085; C21D 7/12; C21D 8/10; C21D 8/105; C21D 9/10; C21D 9/12; C21D 9/14
See application file for complete search history.

(56) References Cited

U.S. PATENT DOCUMENTS

| | | |
|---|---|---|
| 5,487,795 A | 1/1996 | Kim et al. |
| 5,653,937 A | 8/1997 | Kim et al. |
| 8,202,376 B2 | 6/2012 | Gehringhoff et al. |

(Continued)

FOREIGN PATENT DOCUMENTS

| | | |
|---|---|---|
| EP | 2824196 A1 | 1/2015 |
| KR | 10-2004-0057897 A | 7/2004 |

(Continued)

*Primary Examiner* — Vanessa T. Luk
(74) *Attorney, Agent, or Firm* — Mintz Levin Cohn Ferris Glovsky and Popeo, P.C.; Peter F. Corless

(57) ABSTRACT

A steel composition, a reinforcement part of a vehicle using the steel composition and a method of manufacturing the reinforcement part using the steel composition are provided. In particular, the steel composition includes increased content of carbon components and the steel composition is processed by rapid heating and immediate quenching.

3 Claims, 18 Drawing Sheets

(51) Int. Cl.
 *C22C 38/22* (2006.01)
 *C22C 38/28* (2006.01)

(56) References Cited

U.S. PATENT DOCUMENTS

| | | | |
|---|---|---|---|
| 8,480,824 B2 | 7/2013 | Cola, Jr. et al. | |
| 2005/0034795 A1* | 2/2005 | Motoyoshi | C21D 9/08 |
| | | | 148/570 |
| 2010/0132854 A1* | 6/2010 | Cola, Jr. | C21D 1/08 |
| | | | 148/575 |
| 2013/0333811 A1* | 12/2013 | Batiste | C21D 1/18 |
| | | | 148/529 |
| 2017/0145528 A1* | 5/2017 | Cola, Jr. | C22C 38/38 |
| 2018/0073096 A1* | 3/2018 | Wakabayashi | B21D 53/88 |

FOREIGN PATENT DOCUMENTS

| | | | |
|---|---|---|---|
| KR | 10-2007-0004055 A | 1/2007 | |
| KR | 10-1231947 | 2/2013 | |
| KR | 10-2013-0002188 | 11/2013 | |
| KR | 10-2014-0119811 A | 10/2014 | |
| KR | 10-1501995 | 3/2015 | |
| WO | WO-2015195851 A1 * | 12/2015 | C22C 38/38 |
| WO | WO-2016152671 A1 * | 9/2016 | B21D 53/88 |

\* cited by examiner

DTR = D/t
D – Diameter (Outside)
t – Thickness

DTR = (D1+D2)/2t
D1 - Major Axis
D2 - Minor Axis
t - Thickness

| Steel Composition | DTR | Conventional Quenching | Flash Process | Flash Process + Tempering |
|---|---|---|---|---|
| Comparative Example | 14.5 | | | |
| Example 1 | 14.5 | | | |
| Example 1 | 11.4 | | | |

LIGHTWEIGHT DOOR BEAM, COMPOSITION THEREOF AND METHOD OF MANUFACTURING THE SAME

FIELD OF THE INVENTION

The present invention relates a steel composition, a reinforcement part of a vehicle using the steel composition and a method of manufacturing the reinforcement part using the steel composition.

BACKGROUND

Reinforcement parts in a vehicle are generally designed to absorb impacts from collision, and boron-hardenable steel (hereinafter "boron steel" or "steel") gaining high level of tensile strength (e.g., about 1400-1600 MPa) through quenching heat treatment has been used in the reinforcement parts such as door beams in the vehicle.

The boron steel in as-quenched condition, however, exhibits relatively low ductility and may be susceptible to brittle fracture under external impact, loading or collision, which may further cause catastrophic failure of the parts. For example, as shown in FIG. 1, a door beam positioned inside of a front door and a rear door of a vehicle may buckle upon impact from a collision causing energy absorption efficiency thereof to diminish, which may further result in pointed loading toward occupant cage rather than evenly distributed bending.

Accordingly, improvement in the boron steel for the vehicle reinforcement part has been demanded in the related fields. For example, a carbon content may be adjusted to improve strength, hardness or toughness, and higher carbon content therein may reduce the amount of the steel for required hardness or strength, thereby reducing a total weight of the reinforcement part. However, energy absorption and ductility of the part typically decrease with increased carbon content and the boron steel composition of those reinforcement parts may include limited content of carbon, for example, less than about 0.23 wt % in the total composition. Accordingly, a novel steel composition and method of manufacturing the reinforcement part using the steel have been demanded to improve toughness and energy absorption and to reduce fracturing properties from the boron steel.

The foregoing is intended merely to aid in the understanding of the background of the present invention, and is not intended to mean that the present invention falls within the purview of the related art that is already known to those skilled in the art.

SUMMARY

The present invention provides steel compositions and methods of manufacturing steel material using the steel composition and further provides ultra-high strength steel door beams. The door beam according to the present invention may have substantially improved crash performance and impact characteristics thereby reducing weight and manufacturing cost.

The steel composition may include increased content of carbon components and thus, the steel composition may be processed using a flash treatment or process that includes rapid heating and immediate quenching thereafter. Accordingly, the reinforcement part may have substantially improved strength and stiffness and deformation or intrusion thereof may be substantially decreased or prevented upon external impact.

In one aspect, the present invention provides a steel composition or a boron steel composition. The steel composition may comprise: carbon (C) in an amount of about 0.23 to 0.35 wt %; manganese (Mn) in an amount of about 0.75 to 1.5 wt %; silicon (Si) in an amount of about 0.20 to 0.40 wt %; aluminum (Al) in an amount of about 0.02 to 0.05 wt %; boron (B) in an amount of about 0.0005 to 0.0025 wt %; chromium (Cr) in an amount of about 0.1 to 0.4 wt %; titanium (Ti) in an amount of about 0.01 to 0.03 wt %; sulfur (S) less than about 0.03 wt %; phosphorus (P) less than about 0.02 wt %; and iron (Fe) constituting the remaining balance of the steel composition. Unless otherwise indicated, all the wt % is based on the total weight of the steel composition.

In certain aspect, the steel composition may include the carbon (C) in an amount of about 0.28 to 0.35 wt % based on the total weight of the steel composition.

In one preferred aspect, the composition may comprise: carbon (C) in an amount of about 0.28 to 0.35 wt %; manganese (Mn) in an amount of about 1.1 to 1.4 wt %; silicon (Si) in an amount of about 0.25 to 0.35 wt %; aluminum (Al) in an amount of about 0.03 to 0.04 wt %; boron (B) in an amount of about 0.0008 to 0.0012 wt %; chromium (Cr) in an amount of about 0.20 to 0.35 wt %; titanium (Ti) in an amount of about 0.015 to 0.025 wt %; sulfur (S) less than about 0.01 wt %; phosphorus (P) less than about 0.015 wt %, and iron (Fe) constituting the remaining balance of the steel composition, all the wt % is based on the total weight of the steel composition.

The present invention further provides the steel composition that may consist essentially of, essentially consist of or consist of the components as described herein. For instance, the steel composition may consist essentially of, essentially consist of, or consist of: carbon (C) in an amount of about 0.28 to 0.35 wt %; manganese (Mn) in an amount of about 1.1 to 1.4 wt %; silicon (Si) in an amount of about 0.25 to 0.35 wt %; aluminum (Al) in an amount of about 0.03 to 0.04 wt %; boron (B) in an amount of about 0.0008 to 0.0012 wt %; chromium (Cr) in an amount of about 0.20 to 0.35 wt %; titanium (Ti) in an amount of about 0.015 to 0.025 wt %; sulfur (S) less than about 0.01 wt %; phosphorus (P) less than about 0.015 wt %, and iron (Fe) constituting the remaining balance of the steel composition, all the wt % is based on the total weight of the steel composition.

In another aspect, the present invention provides a method for manufacturing a boron steel product. The method may include: pre-heating a steel composition to a first predetermined temperature; heat treating, by an induction heating unit, the steel composition to a second predetermined temperature; and cooling, by a cooling unit, the steel composition to a third predetermined temperature. In particular, a temperature of the steel composition may be increased by the induction heat unit to the second predetermined temperature at a rate greater than about 350 to 400° C./sec and the second predetermined temperature may be maintained for less than about 5 second.

In one preferred aspect, the steel composition may comprise: carbon (C) in an amount of about 0.28 to 0.35 wt %; manganese (Mn) in an amount of about 1.1 to 1.4 wt %; silicon (Si) in an amount of about 0.25 to 0.35 wt %; aluminum (Al) in an amount of about 0.03 to 0.04 wt %; boron (B) in an amount of about 0.0008 to 0.0012 wt %; chromium (Cr) in an amount of about 0.20 to 0.35 wt %; titanium (Ti) in an amount of about 0.015 to 0.025 wt %; sulfur (S) less than about 0.01 wt %; phosphorus (P) less than about 0.015 wt %, and iron (Fe) constituting the remaining balance of the steel composition, as all the wt % is based on the total weight of the steel composition.

In one preferred aspect, the second predetermined temperature may be about 1050 to 1150° C. In addition, the third predetermined temperature may be about 10 to 40° C. and a cooling unit may decrease the temperature of the steel composition to the third predetermined temperature at a rate greater than about 1000° C./sec. Further, the first predetermined temperature may be about 750 to 870° C. and the temperature during the preheating may be increased at a rate of about 1 to 100° C./sec.

In certain aspect, the method may include tempering the cooled steel composition at a temperature of about 200 to 250° C. for about 3-10 min.

Further provided is an apparatus that may be used for the method for manufacturing a boron steel product as described herein. The apparatus may include an induction heating unit and a cooling unit.

In another aspect, the present invention also provides a reinforcement part of a vehicle manufactured by the method as described herein. The exemplary reinforcement part may be a door beam.

In one preferred aspect, the door beam may be in a tubular form. In particular, a cross-section shape of the door beam may be ring shaped and a diameter-to-thickness ratio (DTR) of the door beam may range from about 11.4 to about 13.0.

Still further provided is a vehicle that may comprise the door beam as described herein.

Other aspects of the invention are disclosed infra.

BRIEF DESCRIPTION OF THE DRAWINGS

The above and other objects, features and advantages of the present invention will be more clearly understood from the following detailed description taken in conjunction with the accompanying drawings, in which.

REFERENCES

Figure 1:
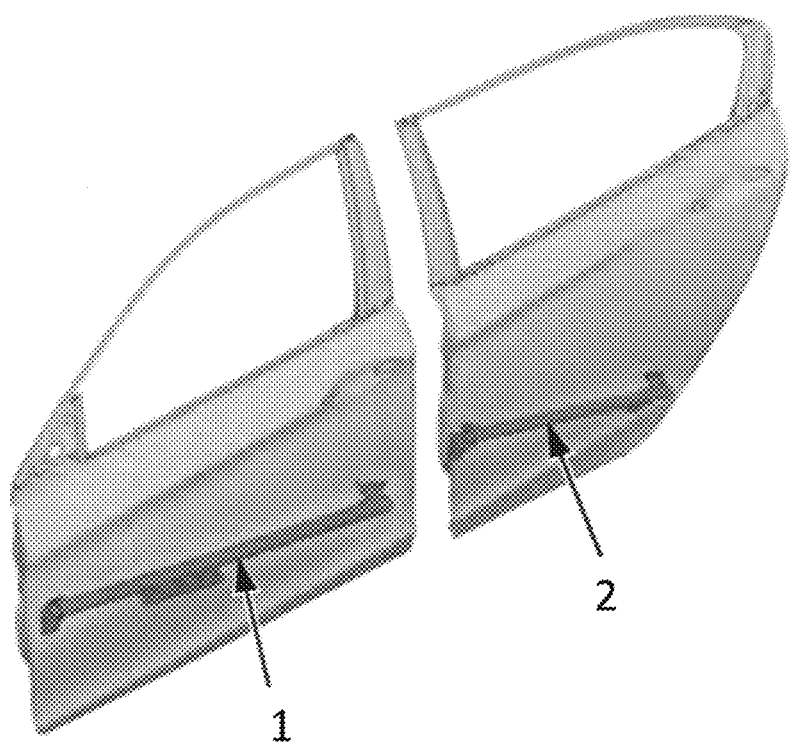
FIG. 1 illustrates an exemplary door beam of a vehicle and positions of a front door beam and a rear door beam according to the related art.

1: front door beam
2: rear door beam
3: Induction heating unit
4: steel sheet
5: upper feed rollers
6: quench bath
7: lower feed rollers

DETAILED DESCRIPTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Steel Composition

The present invention provides a steel composition, for example, a hot rolled steel or a cold rolled steel composition, used in a reinforcement part of a vehicle. The steel of the present invention may be an alloy of iron with carbon, manganese, silicon, aluminum, boron, chromium, titanium, sulfur and phosphorus components.

The term "hot rolled steel" is meant by a metal material or steel that may be processed via rolling, for example, rolling mills, at a temperature above a recrystallization temperature of the metal. The term "cold rolled steel" is meant by a metal material or steel that may be processed via rolling, for example, rolling mills, at a temperature below a recrystallization temperature of the metal.

Carbon (C) as used herein may be an element to increase strength of the steel and improve hardenability and is an effective element used to increase strength after heat treatment such as a flash process. The steel composition may include carbon in an amount of about 0.23 to 0.35 wt %, or particularly of about 0.28 to 0.35 wt %, based on the total weight of the steel composition.

In the related art, the content of carbon for the boron steel intended for quenching heat treatment to achieve martensitic structure may be limited to be less than about 0.23 wt % based on the total weight of the steel composition, since the increased amount of carbon has been shown to reduce ductility and energy absorption of the thus manufacture steel. See also, Mechanical Properties of Martensitic Steel, Hiroto Tenabe et al: High-Strength Steel Tubes for Automobile Door Impact Beam, Nippon Steel Tec. Report No. 64 January 1995, which is incorporated herein by reference.

Manganese (Mn) as used herein may improve hardenability and strength of the steel. The steel composition may include manganese in an amount of about 0.75 to 1.5 wt %, or particularly of about 1.1 to 1.4 wt % based on the total weight of the steel composition. When the content of manganese is greater than the predetermined range, for example, greater than about 1.5 wt %, toughness and weldability of the steel may be substantially reduced.

Silicon (Si) as used herein may improve weldability and hardenability and the steel composition may include silicon in an amount of about 0.20 to 0.40 wt %, or particularly of about 0.25 to 0.35 wt %, based on the total weight of the steel composition.

Aluminum (Al) as used herein may be a deoxidizer in the steel composition and restrict or prevent grain growth. The steel composition may include aluminum in an amount of about 0.02 to 0.05 wt %, or particularly of about 0.03 to 0.04 wt %, based on the total weight of the steel composition.

Boron (B) as used herein may improve hardenability of the steel composition. The steel composition may include boron in an amount of about 0.0005 to 0.0025 wt %, or particularly of about 0.0008 to 0.0020 wt %, based on the total weight of the steel composition.

Chromium (Cr) as used herein may promote carbide forming, and may prevent or delay carbide dissolution at the austenitizing temperature during the rapid heating process. The steel composition may include chromium in an amount of about 0.1 to 0.4 wt %, or particularly in an amount of about 0.20 to 0.35 wt %, based on the total weight of the steel composition.

Titanium (Ti) as used herein may form carbide and nitride compounds as micro alloying element. The steel composition may include titanium in an amount of about 0.01 to 0.03 wt %, or particularly of about 0.015 to 0.025 wt %, based on the total weight of the steel composition. However, when the content of the titanium is greater than about the predetermined range, for example, greater than about 0.03 wt %, the steel may reduce hardenability.

Sulfur (S) as used herein may be limited to an amount less than about 0.03 wt % or particularly less than about 0.01 wt %, based on the total weight of the steel composition. When the content of sulfur is greater than the predetermined amount, for example, greater than about 0.03 wt %, ductility and weldability of the steep product may deteriorate. For the same reason, phosphorus (P) may be limited to an amount less than about 0.02 wt %, or particularly less than about 0.015 wt %, based on the total weight of the steel composition. For instance, increased phosphorus content may reduce or deteriorate ductility of the steel product.

In one exemplary embodiment, the steel composition may include carbon (C) in an amount of about 0.23 to 0.35 wt %, manganese (Mn) in an amount of about 0.75 to 1.5 wt %, silicon (Si) in an amount of about 0.20 to 0.40 wt %, aluminum (Al) in an amount of about 0.02 to 0.05 wt %, boron (B) in an amount of about 0.0005 to 0.0025 wt %, chromium (Cr) in an amount of about 0.1 to 0.4 wt %, titanium (Ti) in an amount of about 0.01 to 0.03 wt %, sulfur (S) less than about 0.03 wt %, phosphorus (P) less than about 0.02 wt %, and iron (Fe) constituting the remaining balance of the steel composition, all the wt % is based on the total weight of the steel composition.

In another exemplary embodiment, the steel composition may include carbon (C) in an amount of about 0.28 to 0.35 wt %, manganese (Mn) in an amount of about 1.1 to 1.4 wt %, silicon (Si) in an amount of about 0.25 to 0.35 wt %, aluminum (Al) in an amount of about 0.03 to 0.04 wt %, boron (B) in an amount of about 0.0008 to 0.0020 wt %, chromium (Cr) in an amount of about 0.20 to 0.35 wt %, titanium (Ti) in an amount of about 0.015 to 0.025 wt %, sulfur (S) less than about 0.01 wt % phosphorus (P) less than about 0.015 wt %, and iron (Fe) constituting the remaining balance of the steel composition, all the wt % is based on the total weight of the steel composition.

In a further exemplary embodiment, further provided is the steel composition that may consist essentially of carbon (C) in an amount of about 0.28 to 0.35 wt %, manganese (Mn) in an amount of about 1.1 to 1.4 wt %, silicon (Si) in an amount of about 0.25 to 0.35 wt %, aluminum (Al) in an amount of about 0.03 to 0.04 wt %, boron (B) in an amount of about 0.0008 to 0.0012 wt %, chromium (Cr) in an amount of about 0.20 to 0.35 wt %, titanium (Ti) in an amount of about 0.015 to 0.025 wt %, sulfur (S) less than about 0.01 wt %, phosphorus (P) less than about 0.015 wt %, and iron (Fe) constituting the remaining balance of the steel composition, all the wt % is based on the total weight of the steel composition.

In yet another exemplary embodiment, further provided is the steel composition that may consist of carbon (C) in an amount of about 0.28 to 0.35 wt %, manganese (Mn) in an amount of about 1.1 to 1.4 wt %, silicon (Si) in an amount of about 0.25 to 0.35 wt %, aluminum (Al) in an amount of about 0.03 to 0.04 wt %, boron (B) in an amount of about 0.0008 to 0.0012 wt %, chromium (Cr) in an amount of about 0.20 to 0.35 wt %, titanium (Ti) in an amount of about 0.015 to 0.025 wt %, sulfur (S) less than about 0.01 wt % phosphorus (P) less than about 0.015 wt %, and iron (Fe) constituting the remaining balance of the steel composition, all the wt % is based on the total weight of the steel composition.

In one preferred aspect, the steel composition of the present invention features the increased carbon content in the steel composition for a hot or cold rolled steel.

Method and Apparatus

The present invention provides a method of heat treating of boron steel using the steel composition as described herein. The produced sheet or tubing may be used for a reinforcement part of a vehicle, for example, a door beam. Particularly, the method features a rapid or flash heating step during heat treatment process.

Figure 2:
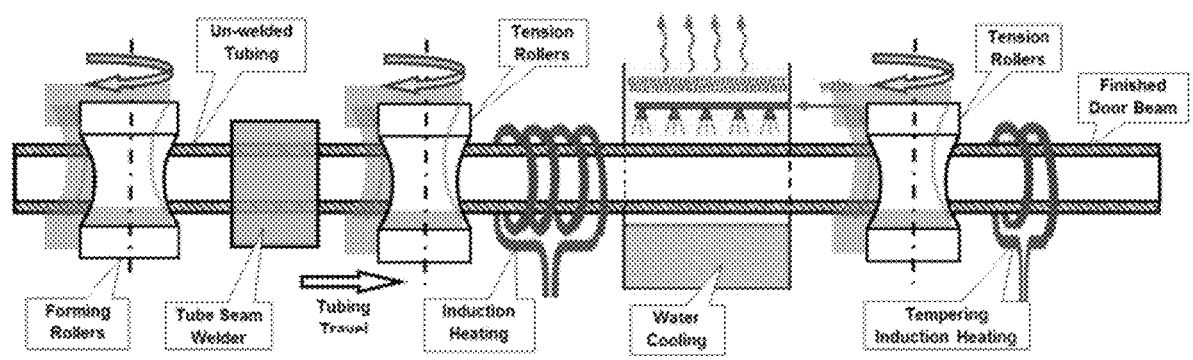
FIG. 2 shows an exemplary process for producing a hot rolled steel tube according to an exemplary embodiment of the present application.
Figure 3:
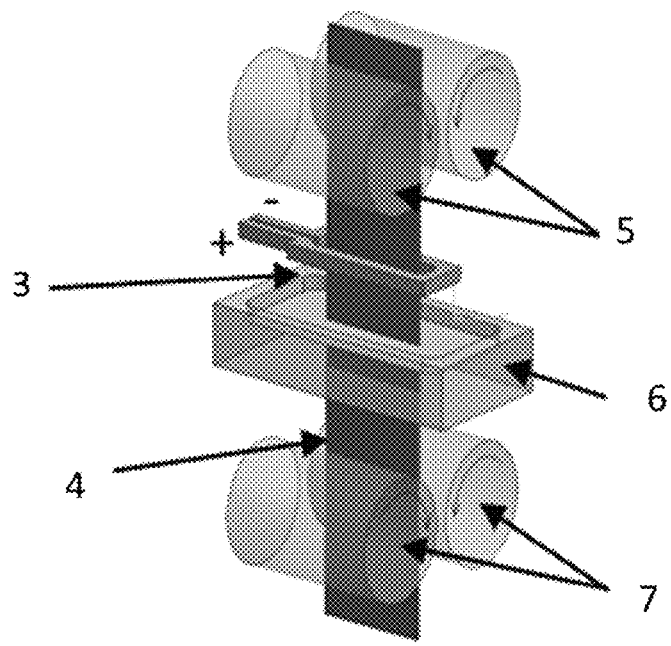
FIG. 3 shows an exemplary process for producing a hot rolled steel sheet according to an exemplary embodiment of the present application.

FIGS. 2-3 illustrate exemplary process and apparatus for heat treatment. For example, FIG. 2 shows proposed process for roll forming and heat treating of tubular material and FIG. 3 shows a concept process set-up for heat treating of steel sheet or tubing (utilized in this study). The heat treatment process may include a heating step by an induction heating unit before quenching, which may increase the temperature of the steel material to a predetermined temperature, e.g., austenitizing temperature, where ferritic microstructure in the steel composition may begin to transform to austenitic phase.

In one aspect, the method of manufacturing a steel may include: heating a steel composition, and cooling (quenching) the heated steel composition. Additionally, the method may optionally include preheating executed before the heating process. Further, the method may optionally include a step of tempering after the cooling process.

In one preferred aspect, the method may include: preheating a steel composition to a first predetermined temperature; heat treating, by an induction heating unit, the steel composition to a second predetermined temperature; and cooling, by a cooling unit, the steel composition to a third predetermined temperature. During the preheating, the steel composition may be heated to the first predetermined temperature of about 750 to 870° C. (below Ac1). The temperature during the preheating step may be increased at a rate of about 1 to 100° C./sec.

The steel composition, when entering the induction heating unit, may be heated to an austenitizing temperature which may be at or around the second predetermined temperature and subsequently transformation of ferrite to austenite may occur. The heating, by the induction heating unit, may be performed at the second predetermined temperature of about 1050 to 1150° C., or particularly of about 1060 to 1080° C. The second predetermined temperature, i.e. austenitizing temperature for the steel composition of the present invention, may be less than an austenitizing temperature (e.g. 1120-1150° C.) of the conventional boron steel composition for hardening. The temperature of the heating process may be rapidly increased at a rate of about 350 to 400° C./sec. After the rapid increase of the temperature, the second predetermined temperature may be maintained for about 5 seconds or less, for about 3 seconds or less, or particularly for about 2 seconds or less.

In particular, due to the rapid heating during the exemplary heating process of the present invention and substantially reduced heating time, the amount of dissolved carbide (cementite) may be substantially reduced among other steel components in the steel melt (matrix). For instance, carbides (cementite) may dissolved only in a portion less than about 20%, less than about 15%, less than about 10%, less than about 5% or less than about 1% of the total carbide formed in the steel composition before the heating process (rapid heating process). Accordingly, austenite at the transformation during the rapid heating may be carbon depleted, thereby resulting in good combination of increased strength and ductility of the steel product due to microstructure such as martensite and bainite.

Further, since the steel composition of the present invention may include the increased carbon content compared to the conventional steel composition for the boron steel, increased fraction of carbide may be formed or may remain in the steel product after the heat treatment process thereby improving strength thereof.

Figure 4:
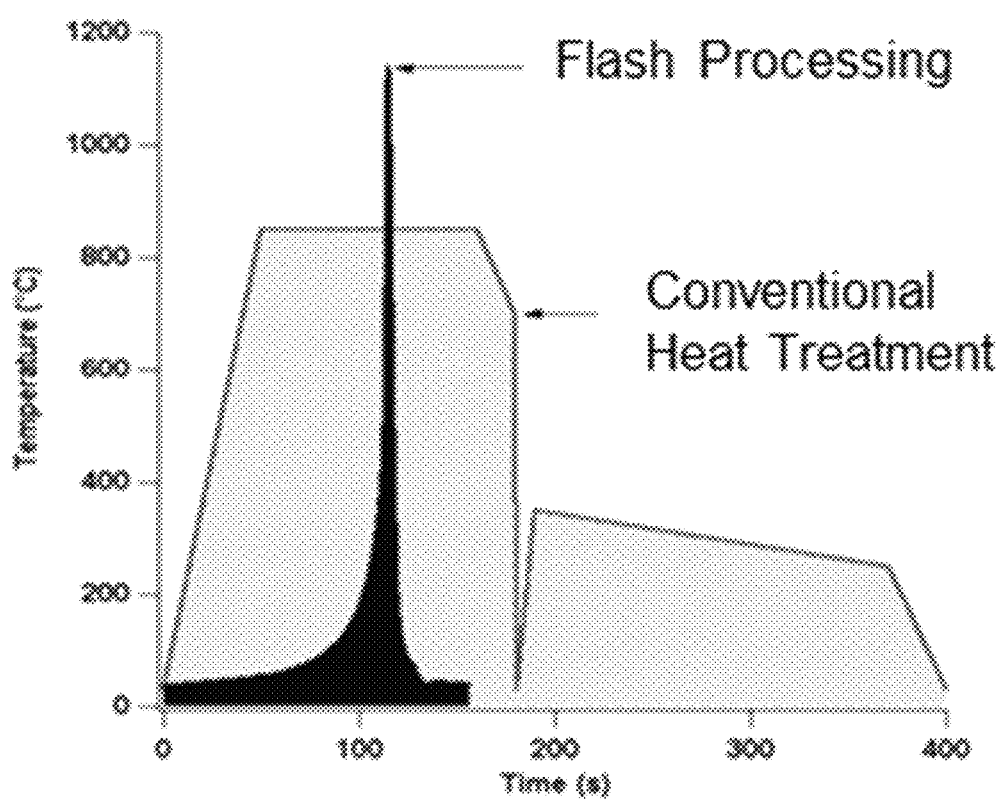
FIG. 4 shows an exemplary heating step for treatment the boron steel according to an exemplary embodiment of the present invention.

FIG. 4 shows an exemplary heating step for manufacturing the boron steel according to an exemplary embodiment of the present invention. Unlike conventional heat treatments, the rapidly heated steel composition may be quenched after a short hold of about 2 seconds or less, above the temperature where ferrite may transform into austenite.

The cooling or quenching may be subsequently performed at the third predetermined temperature (cooling or quenching temperature) of about 10 to 40° C., of about 10 to 30° C., or of about 20 to 25° C. After the rapid heating and short duration of the second predetermined temperature, the temperature of the steel may be decreased at a rate greater than about 1000° C./sec, greater than about 2000° C./sec, or particularly greater than about 3000° C./sec during the cooling process. The cooling method may not be particularly limited and exemplary cooling or quenching process may include using a water bath, by optionally agitating, or a multiple jet spray, or the like.

Hereinafter, the term "flash process" refers to a combined process of a rapid heating and an immediate cooling as described above. For instance, the flash process may include heating, by an induction heating unit, the steel composition to a temperature of about 1050 to 1150° C., at a heating rate of about 350 to 400° C./sec, for less than about 5 seconds, and cooling, by a cooling unit, the heated steel composition to a temperature of about 10 to 40° C. at a cooling rate greater than about 1000° C./sec. In addition, according to various exemplary embodiments, the flash process may generate or adjust micro-segregation either in chemistry of components or phase.

The cooled steel may be optionally tempered according to an exemplary embodiment of the present invention, particularly for the steel composition with increased carbon content. The tempering may be performed at a temperature of about 200 to 250° C., or particularly of about 220 to 240° C., and the tempering may be performed for about 3 to 10 min. Additional tempering of the boron steel may improve ductility of the high-carbon content (e.g. carbon content of about 0.30 wt %) steel composition.

In one preferred aspect, the present invention also provides an apparatus that may be used for the method of heat treating the boron steel. In particular, the apparatus may include an induction heating unit for rapid (flash) heating at substantially increased heating rate (e.g. at least of about 1000° C./sec) as discussed above. The induction heating unit may be provided separately or incorporated in a tube milling process (FIG. 2). For example, a steel sheet or tubing may be fed at a constant rate through either vertical or horizontal guide rollers. The steel may enter the induction heating unit which may heat to the austenitizing temperature or above, for example of about 1050° C. to 1150° C. The apparatus may further include cooling (quenching) unit such as a water bath and a multiple jet spray. The cooling unit may maintain the temperature of about 10 to 40° C., of about 10 to 30° C., or of about 20 to 25° C. and the cooling rate of the steel may be greater than about 1000° C./sec, greater than about 2000° C./sec, or particularly greater than about 3000° C./sec in the cooling unit.

The apparatus may optionally include tempering unit which may include another induction heating unit. The tempering unit may maintain the temperature of about 200-250° C., or particularly of about 220 to 240° C., and for about 3-10 min.

According to various exemplary embodiments of the present invention, the method including rapid heating and immediate cooling may provide a steel product comprising the steel composition as described above. In particular, the steel composition comprising increased carbon content of about 0.23 wt % to 0.35 wt % may be manufactured into tubular material having substantially improved tensile strength without deterioration or adverse effect on toughness and elongation by the above described rapid heating and immediate cooling processes below (Tables 1-2). To the contrary, when a conventional heating and quenching processes are applied to the steel composition of high-carbon content (e.g. carbon content of 0.30 wt %), elongation thereof may be substantially reduced and the steel product or material may brittle. Further, the method of rapid heating and immediate cooling may improve production yield of the steel material using the steel composition described above.

Door Beam

In one preferred aspect, the present invention also provides a reinforcement part of a vehicle. The reinforcement part may include a door beam that may be horizontally or substantially horizontally mounted inside a door cavity of a vehicle so as to provide substantially increased resistance against side impacts to the vehicle door in the event of a collision.

The door beam of the present invention may comprise the steel composition as described herein. In addition, the door beam may be produced by a method including rapid heating and immediate cooling (quenching) processes, which may be beneficial for the door beams comprising the increased content of carbon. For instance, strength and stiffness of the door beam may be substantially increased and deformation and rate of intrusion may be substantially reduced due to increased ductility and energy absorption using the steel composition as described herein.

Figure 5A:
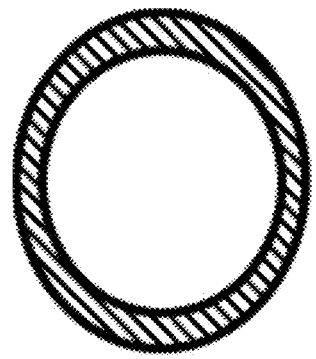
FIG. 5A shows a circular cross sectional shape of an exemplary tubular door beam product according to an exemplary embodiment of the present invention.
Figure 5B:
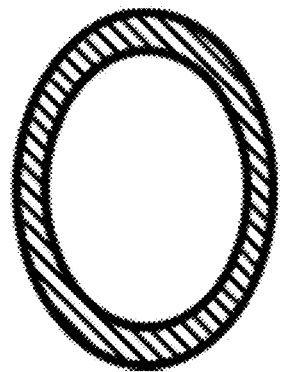
FIG. 5B shows an oval cross sectional shape of an exemplary tubular door beam product according to an exemplary embodiment of the present invention.
Figure 5C:
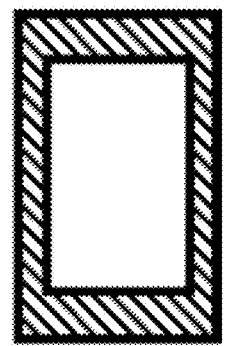
FIG. 5C shows a rectangular cross sectional shape of an exemplary tubular door beam product according to an exemplary embodiment of the present invention.
Figure 5D:
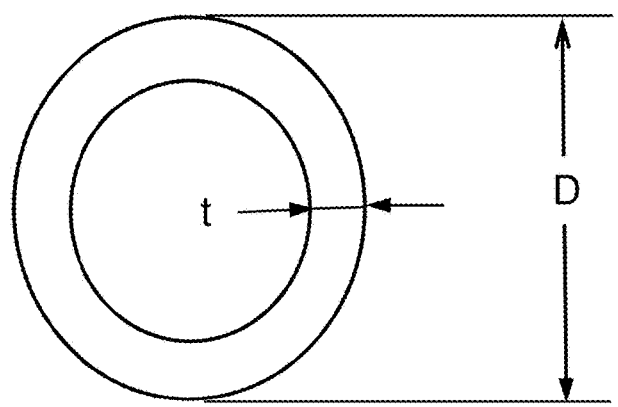
FIG. 5D shows an exemplary diameter-to-thickness ratio (DTR) of an exemplary tubular (ring-shaped) beam according to an exemplary embodiment of the present invention.
Figure 5E:
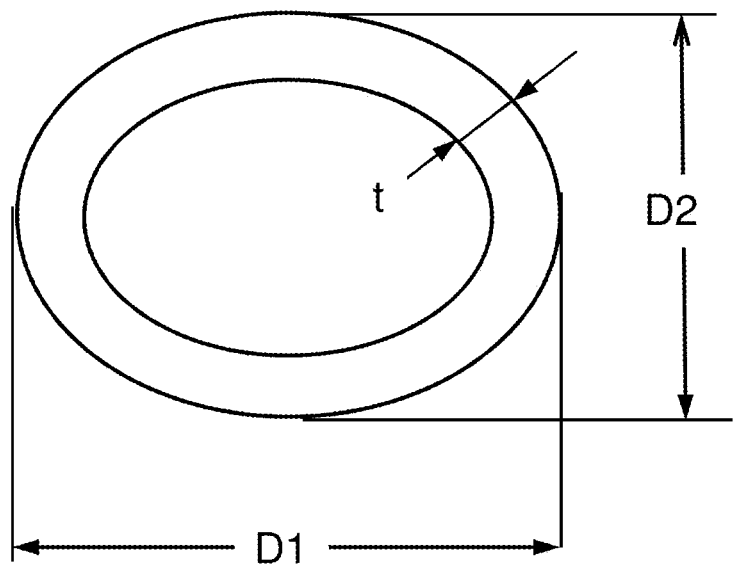
FIG. 5E shows an exemplary DTR of an exemplary oval-ring shaped beam according to an exemplary embodiment of the present invention.
Figure 5F:
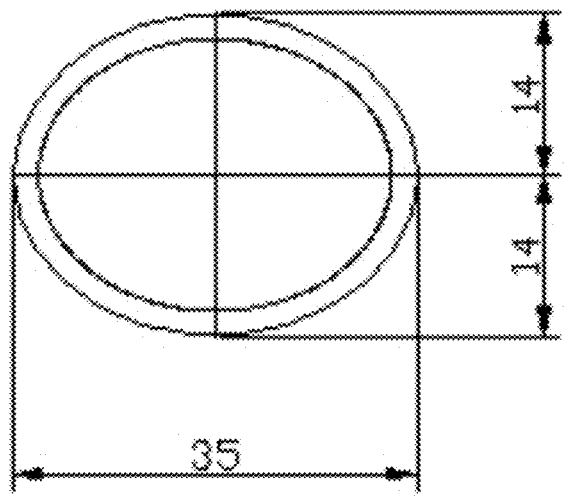
FIG. 5F shows an exemplary door beam having an oval-ring shape according to an exemplary embodiment of the present invention.

The door beam may be produced in a form of hollow or tube, while a shape of the cross-sectional area may not particularly limited. For example, as shown in FIGS. 5A-5C, the cross sectional shape of the tubular door beam product may include circle (FIG. 5A), oval (FIG. 5B), rectangular (FIG. 5C), square, or any other shape, which may be applied to the door beam design. The door beam may have a predetermined thickness due to the hollow or tubular form thereof. The thickness may range from about 1 to 10 mm, from about 2 to 5 mm, or particularly from about 2 to 3 mm. In addition, the door beam includes with a wide range of Diameter-to-Thickness Ratio (DTR). For example, as shown in FIG. 5D, the diameter-to-thickness ratio (DTR) may be determined by an outer diameter (D) of tubular (ring-shaped) beam and a thickness (t). For the oval shaped door beam (FIG. 5E), the DTR may be calculated with average of outer diameter at major (D1) and minor axis (D2) and a thickness (t). FIG. 5F shows an exemplary door beam having an oval shape with major axis of 35 mm and minor axis of 28 mm.

Figure 6A:
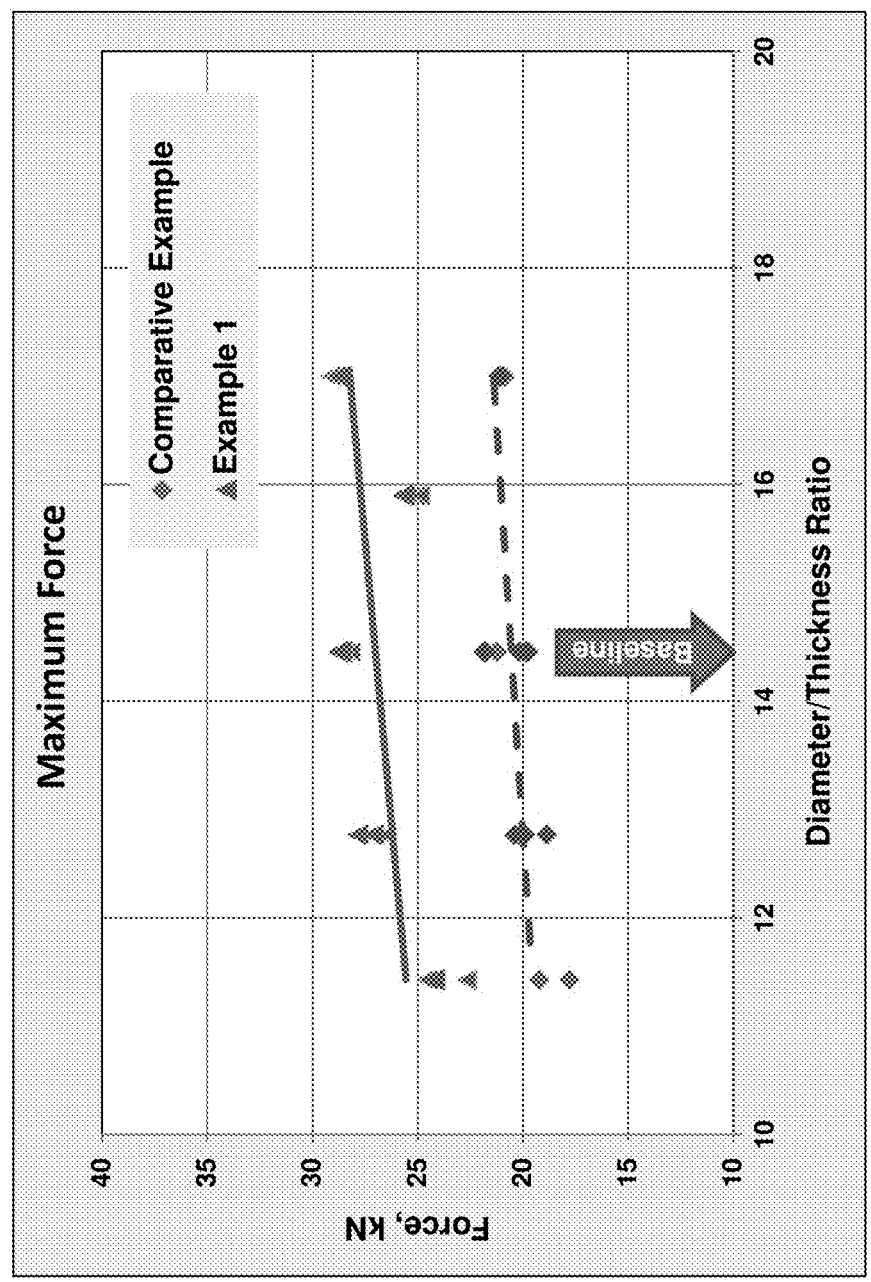
FIG. 6A indicates a maximum force applied to an exemplary door beam according to an exemplary embodiment of the present invention.
Figure 6B:
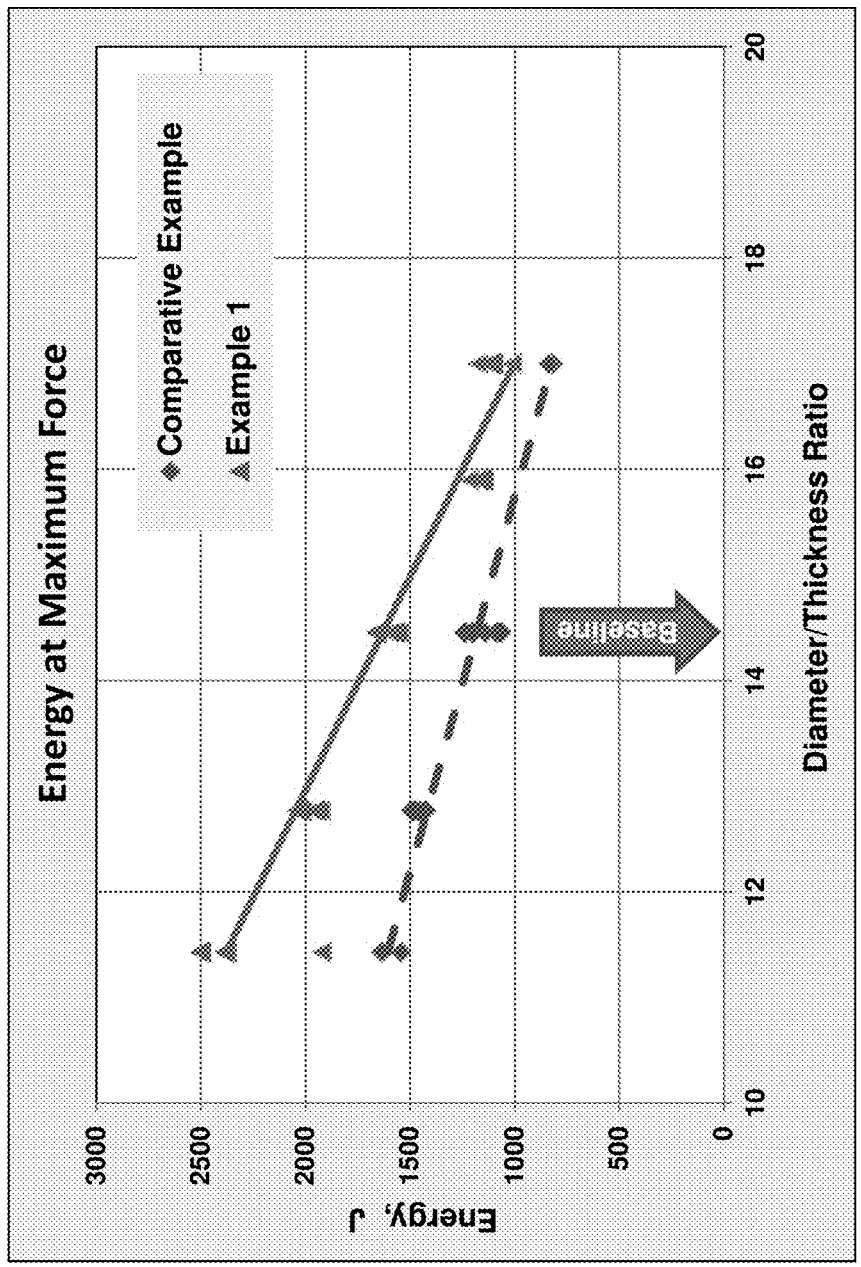
FIG. 6B indicates an energy received at the maximum force to an exemplary door beam according to an exemplary embodiment of the present invention.
Figure 6C:
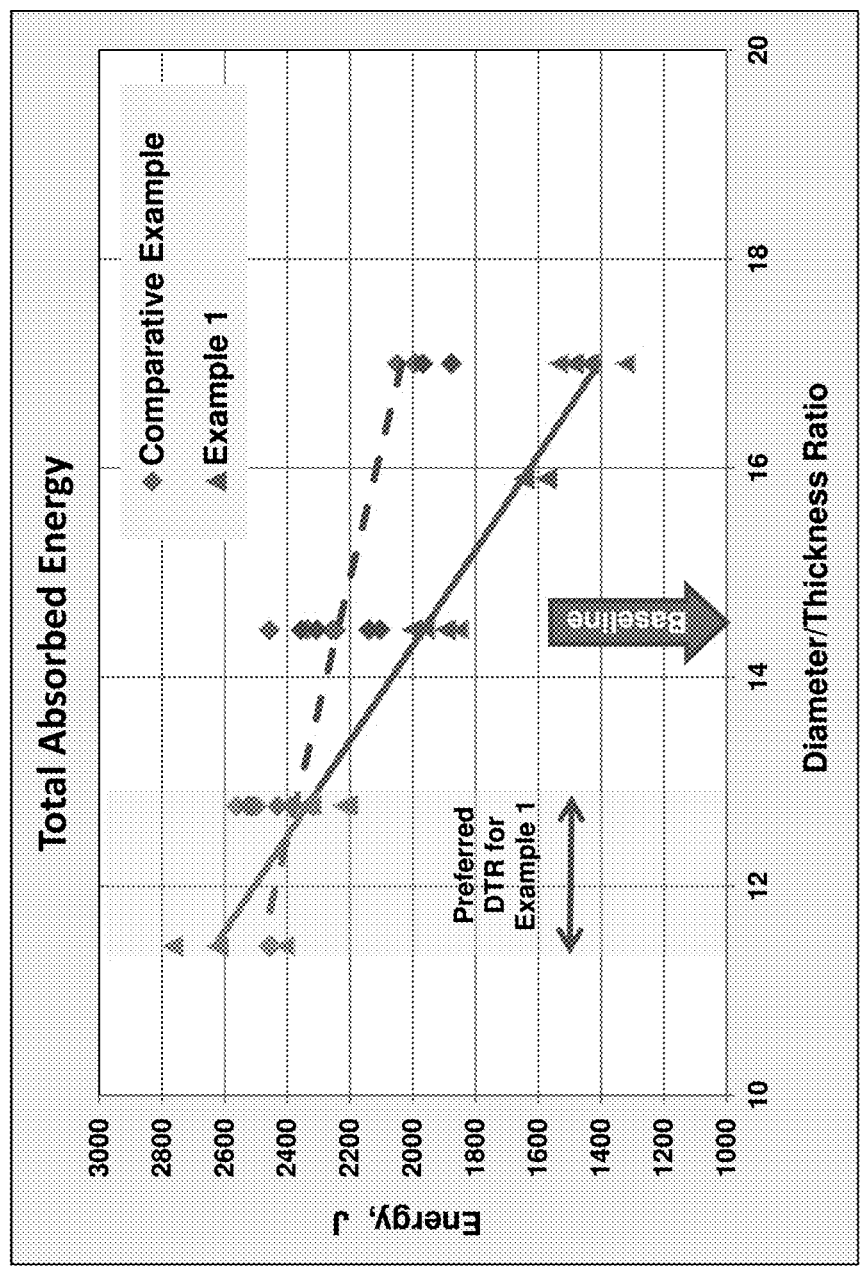
FIG. 6C indicates a total absorbed energy at the maximum force to an exemplary door beam according to an exemplary embodiment of the present invention.

FIGS. 6A-6C show effects of DTR on impact characteristics of an exemplary door beam according to an exemplary embodiment of the present invention in comparison to the conventional door beam. FIG. 6A indicates a maximum force applied to the door beam, FIG. 6B indicates an energy received at the maximum force and FIG. 6C indicates a total absorbed energy at the maximum force. In particular, the DTR range where the total absorbed energy of the exemplary door beam is greater than that of the conventional door beam may be preferred for reducing weight of the steel produce. Accordingly, the DTR for the door beam may range from about 11.4 to about 16.0, or particularly from about 11.4 to about 13.0.

EXAMPLE

Hereinafter, (material/composition) according to an exemplary embodiment of the present invention will be described with reference to the accompanying drawings.
Steel Material The steel material of Comparative Example 1 and Example 1 are shown in Table 1 below. According to an exemplary embodiment of the present invention, Example 1 was prepared to include carbon content of 0.35 wt % based on the total weight of the steel composition, while Comparative Example 1 included carbon content of 0.22 wt % which is less than the carbon content range as described in the present invention.

TABLE 1

| | Composition | | | | | | | | | |
|---|---|---|---|---|---|---|---|---|---|---|
| | C (wt %) | S (wt %) | P (wt %) | Si (wt %) | Mn (wt %) | Cr (wt %) | Mo (wt %) | Al (wt %) | Ti (wt %) | B (wt %) |
| Comparative Example 1 | 0.22 | 0.005 | 0.017 | 0.35 | 1.20 | 0.19 | 0.02 | 0.032 | 0.024 | 0.0012 |
| Example 1 | 0.35 | 0.005 | 0.013 | 0.30 | 1.14 | 0.22 | 0.02 | 0.033 | 0.016 | 0.0008 |

Test Methods

Figure 7A:
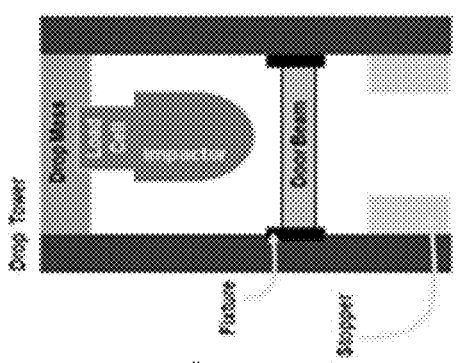
FIG. 7A shows an exemplary drop weight tower test as a component functional test for door beams.
Figure 7C:
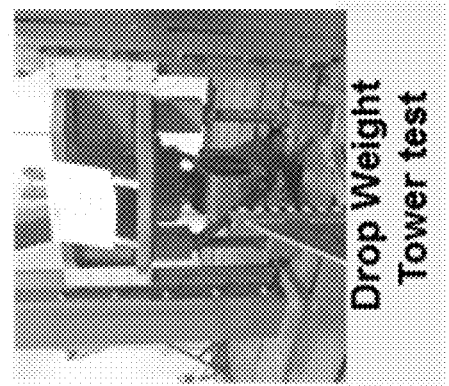
FIG. 7C shows a total absorbed energy measured by drop weight tower test.
Figure 7C:
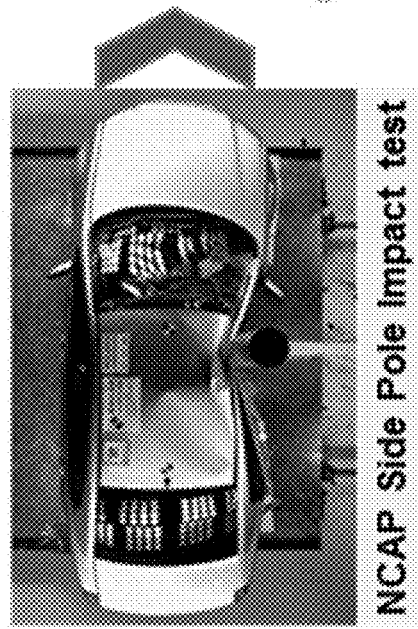
Figure 7C:
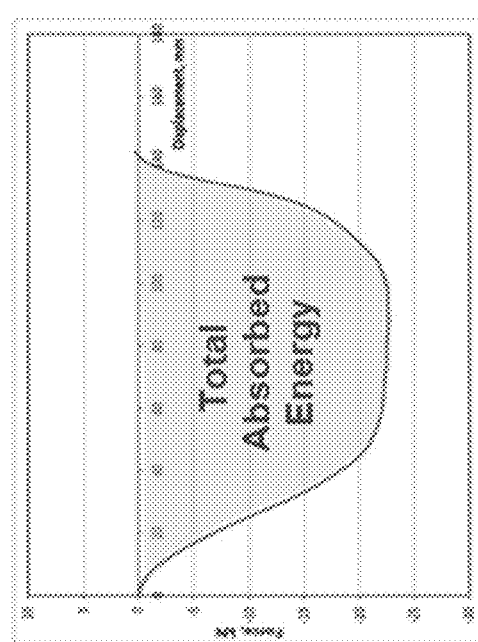
Figure 7B:
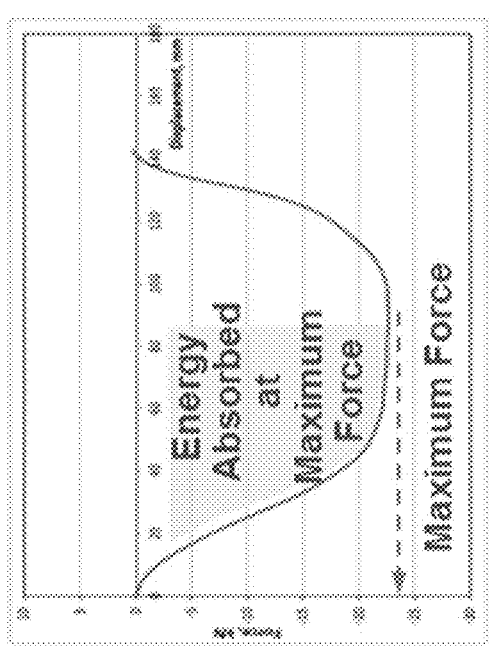
FIG. 7B shows a maximum force and an energy absorbed at maximum force to a door beam during the drop weight tower test.

Advantageous effects of the steel composition and flash processing according to various exemplary embodiments of the present invention were quantified based on impact performance to the door beams as shown in FIGS. 7A-7C.

Drop weight tower test was performed as a component functional test for door beams and the test parameters were designed to simulate the NCAP Side Pole vehicle crash test as shown in FIG. 7A. Accordingly, maximum force, energy absorbed at maximum force, and total absorbed energy were measured by drop weight tower test and calculated as shown in FIGS. 7B-7C.

Effect of Flash Process

Steel products (door beams) were prepared using the steel composition of Comparative Example 1 and Example 1 and Table 2 below lists exemplary door beams 1-5 which were prepared by conventional methods, the flash process of the present invention or the flash process with tempering process.

To prepare the door beam, the steel products (door beams) were prepared using master coil slit in narrow coils. The slit coil was formed into tubular shape and high frequency welded at tube mill, and the thus formed tubing was cut into beam length. The individual door beam was placed on conveyor belt and transferred or rolled to a heating unit to reach austenitizing temperature.

For the conventional quenching process, the door beam was heated to the austenitizing temperature of about 900 to 950° C. with a heating rate of about 80 to 120° C./s, and the beam was held at the austenitizing temperature for about 2-3 minutes. Subsequently, the beam was cooled by water spray at a cooling rate of about 30 to 50° C./s, but no tempering was performed.

For the flash process, the door beam was rapidly moved by rollers through induction heating unit to reach austenitizing temperature without preheating process. The austenitizing temperature was about 1060 to 1080° C. for the steel composition of Example 1, and about 1120 to 1160° C. for the steel composition of Comparative Example 1. The door beam was heated to the austenitizing temperature at a heating rate of about 350 to 400° C./s and the heated temperature was held for about 2 to 3 seconds. Subsequently, the beam was cooled in water bath at a temperature of about 20 to 25° C. at a cooling rate of about 1000 to 1200° C./s. Tempering was optionally performed at a temperature of 230° C. for 2-3 minutes for the steel composition of Example 1.

TABLE 2

| Door Beam | Steel composition | Heat Treatment | Yield Strength, MPa | Tensile Strength, MPa | Elongation, % |
|---|---|---|---|---|---|
| 1 | Comparative Example 1 | Conventional Quenching | 1130 | 1530 | 8.5 |
| 2 | Comparative Example 1 | Flash Process | 1110 | 1490 | 10.0 |
| 3 | Example 1 | Conventional Quenching | 1535 | 2175 | 6.5 |
| 4 | Example 1 | Flash Process | 1540 | 2150 | 8.0 |
| 5 | Example 1 | Flash Process + Tempering | 1550 | 2000 | 9.5 |

As shown in Table 2, as comparing Door Beams 1-2 and Door Beams 3-4, the flash processing generally improved elongation and toughness without noticeable effect on the tensile strength.

Effect of Flash Processing on Impact Characteristics of Round Door Beams

Door beams having a round shape were produced using the steel compositions of Comparative Example 1 and Example 1 by the conventional method, flash process of the present invention, or flash process with tempering process according to an exemplary embodiment of the present invention.

Table 3 below lists door beams 6-10 produced in round shape using the conventional steel composition (Comparative Example 1) and the exemplary steel composition (Example 1) and by different heating methods. Generally, impact characteristics of the door beams 6-10 with the flash-processed door beam were improved by about 10-15% compared to conventionally processed door beams. In particular, the door beams 8-10 using the steel composition of Example 1 had substantially improved strength (e.g. maximum force and energy at maximum force) compared to the door beams 6-7. In addition, for the door beams 8-10, energy absorption thereof was increased by about 8 to 20% by the flash process with or without tempering process. Additional tempering treatment resulted in greater energy absorption without noticeable reduction in the maximum force.

Figure 8A:
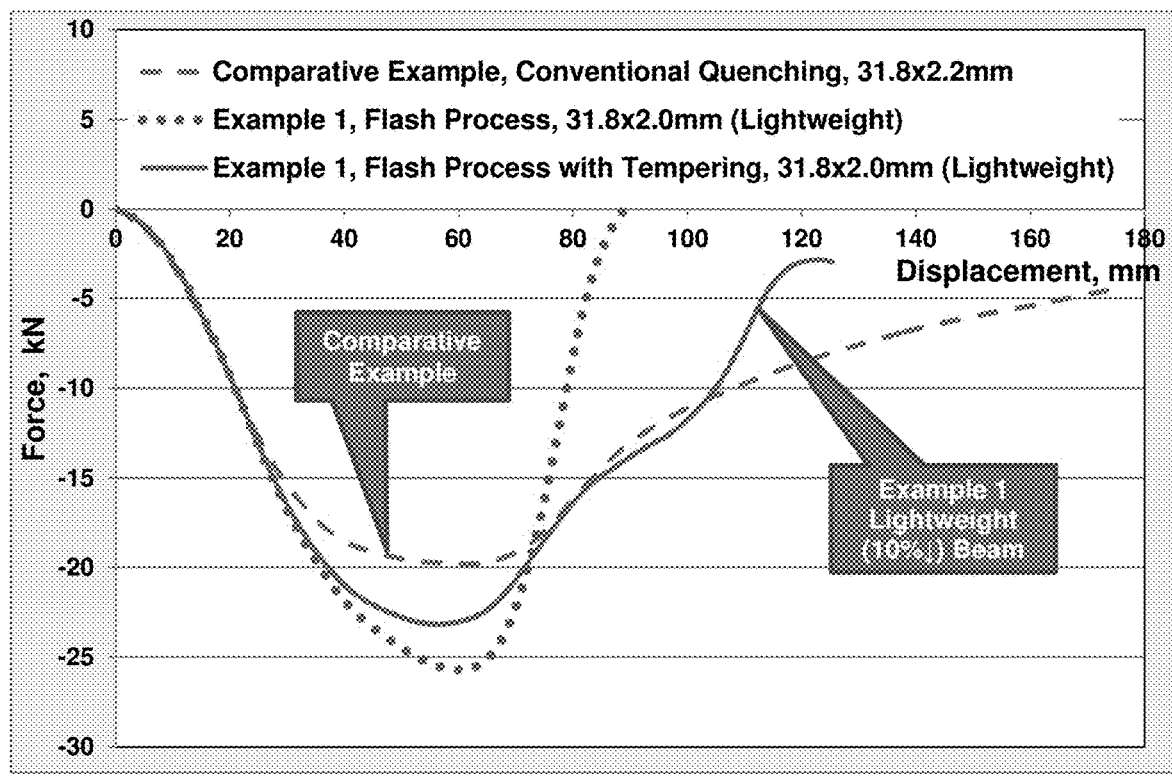
FIG. 8A is a graph showing an weight reduction effect by flash processing combined with the steel composition of Example 1 according to an exemplary embodiment of the present invention.

Alternately, when using flash processing combined with the steel composition of Example 1, weight of the steel product may be reduced by about 10%, thereby reducing production cost and achieving vehicle lightweighting as shown in FIG. 8A.

TABLE 3

| Door Beam | Steel Composition | Heat Treatment | Diameter, mm | Thickness, mm | DTR | Maximum Force, kN | Energy at Max. Force, J | Total Absorbed Energy, J |
|---|---|---|---|---|---|---|---|---|
| 6 | Comparative Example 1 | Conventional Quenching | 31.8 | 2.20 | 14.45 | 19.8 | 1075 | 2205 |
| 7 | Comparative Example 1 | Flash Process | 31.8 | 2.20 | 14.45 | 21.8 | 1240 | 2460 |
| 8 | Example 1 | Conventional Quenching | 31.8 | 2.20 | 14.45 | 28.5 | 1550 | 1855 |
| 9 | Example 1 | Flash Process | 31.8 | 2.20 | 14.45 | 28.7 | 1665 | 2005 |
| 10 | Example 1 | Flash Process + Tempering | 31.8 | 2.20 | 14.45 | 25.7 | 1365 | 2250 |
| 11 | Example 1 | Conventional Quenching | 28.0 | 2.45 | 11.43 | 22.7 | 1925 | 2400 |
| 12 | Example 1 | Flash Process | 28.0 | 2.45 | 11.43 | 24.3 | 2450 | 2760 |
| 13 | Example 1 | Flash Process + Tempering | 28.0 | 2.45 | 11.43 | 22.1 | 1930 | 2590 |

Figure 8B:
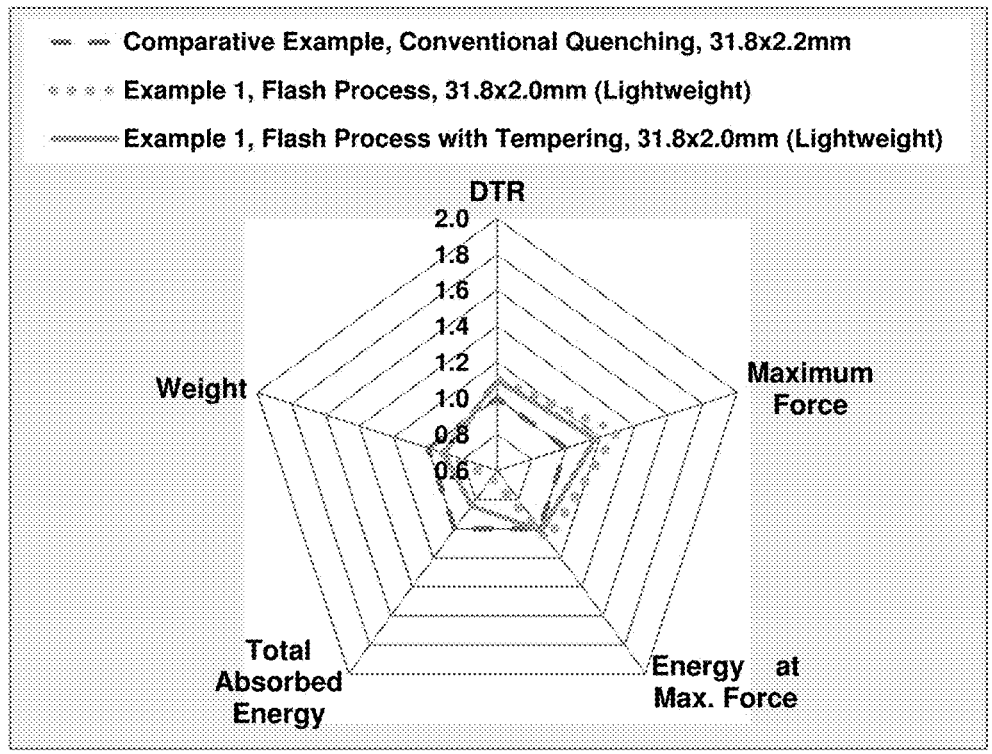
FIG. 8B is a graph showing DTR, weight, and impact properties of exemplary door beams according to an exemplary embodiment of the present invention.

FIG. 8B also shows a graph of DTR, weight, and impact properties of the door beams (Example 1 composition) with 10% reduced weight in comparison to the beam 6 (Comparative Example 1).

Effects of DTR on Impact Characteristics of Round Door Beams

According to the present invention, a range of the diameter to thickness ratio (DTR) of 11.4-13.0 may provide the most energy absorbed with the least reduction of maximum force, thereby efficiently reducing weight of the steel product. As indicated in Table 3 above, the effect on impact characteristics caused by chemistry modification and flash process was more pronounced for the door beams 11-13 with the diameter to thickness ratio of 11.43 as compared to the door beams 8-10 of DTR=14.45.

Figures 9A, 9B:
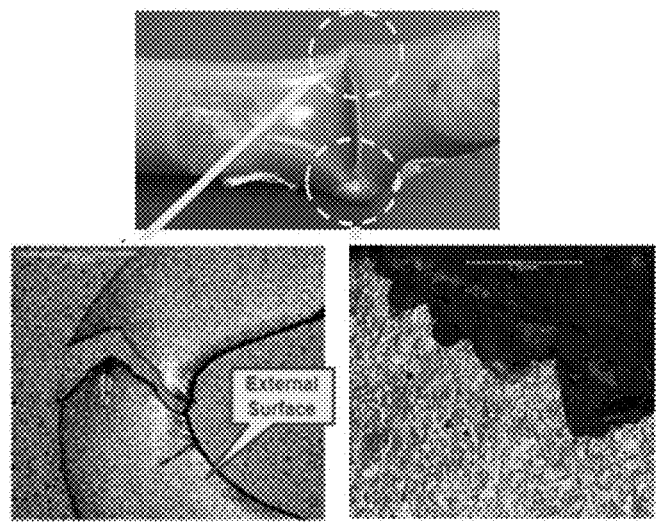
FIG. 9A shows images of brittle structures of exemplary door beams according to an exemplary embodiment to the present invention.
FIG. 9B shows exemplary views of the brittle structure upon collision according to the related art.
Figure 10:
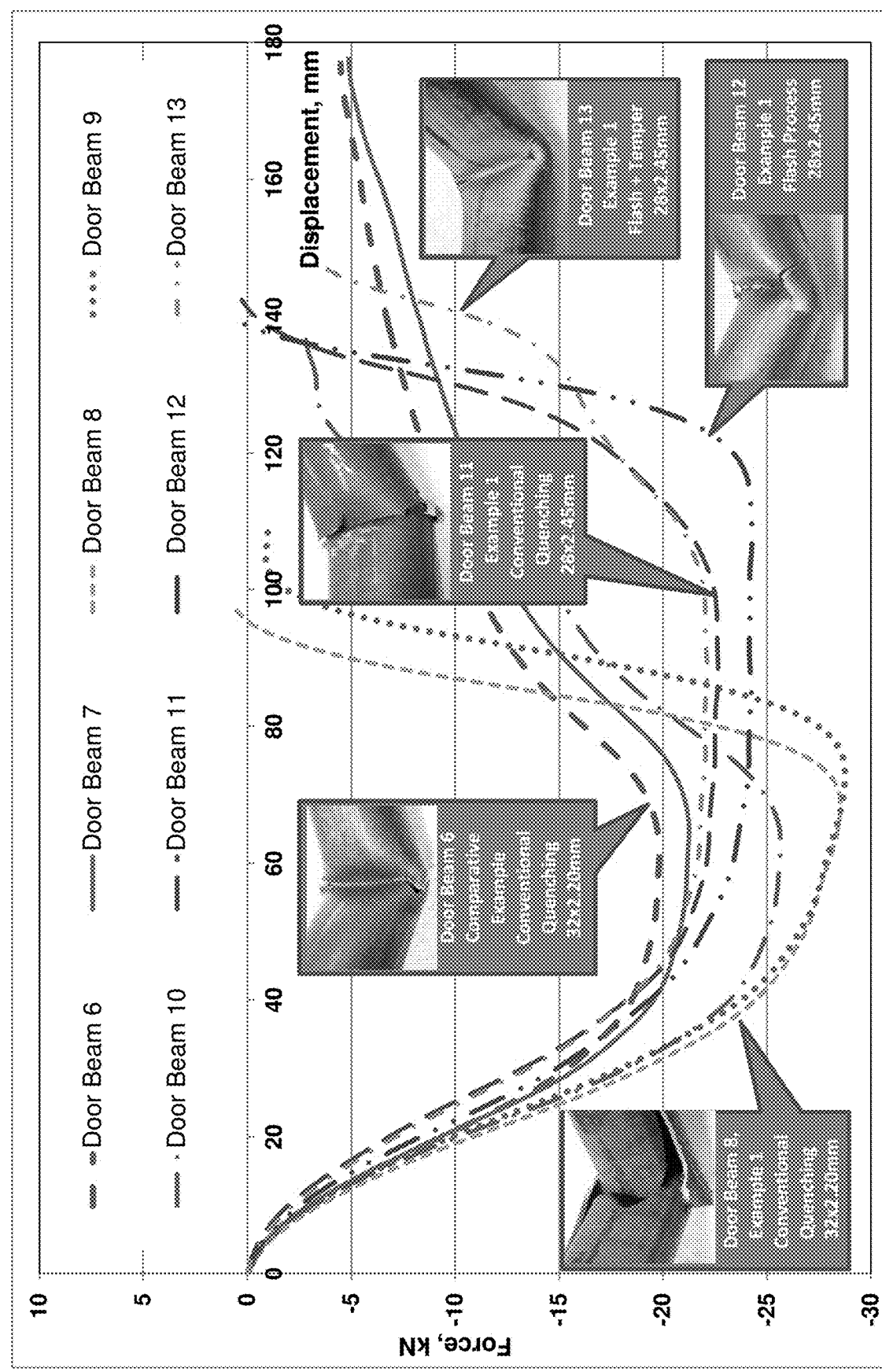
FIG. 10 is a graph of maximum forces upon collision for the various round door beams according to exemplary embodiments of the present invention.

For example, the door beams comprising the steel composition of Example 1 and having DTR of 11.43 may have decreased diameter, increased thickness, and similar weight, but may have increased by about 15 to 25% in Total Energy absorption and 10-20% improvement in maximum force. Also, the Energy at Maximum Force was 1.5-2 times higher for the door beams 11-13 (DTR=11.43) as compared to the beams 6-7 with DTR=14.45. Accordingly, the flash process to the door beams of the steel composition of the present invention may be beneficial, particularly when the door beam has a DTR less than about 13, to prevent brittle structure as shown in FIG. 9A. In addition, when the door beam was produced with tempering after the flash process, the brittle fracture may be mitigated. FIG. 9B shows exemplary views of the brittle fracture upon collision. FIG. 10 is a graph of maximum forces upon collision for the various door beams according to exemplary embodiments of the present invention.

Alternate Door Beam Shape

Flash treatment may be successfully applied to various forms of the door beams, for example, an oval cross-sectional shape. Table 4 below shows impact characteristics of door beams formed in oval cross-sectional shape having a ring structure, which were prepared using the steel compositions of Comparative Example 1 and Example 1 as described above.

TABLE 4

| Door Beam | Steel Composition | Heat Treatment | Diameter, mm | Thickness, mm | DTR | Maximum Force, kN | Energy at Max. Force, J | Total Absorbed Energy, J |
|---|---|---|---|---|---|---|---|---|
| 6 | Comparative Example 1 | Conventional Quenching | 31.8 | 2.20 | 14.45 | 19.8 | 1075 | 2205 |
| 14 | Comparative Example 1 | Flash Process | 35 × 28 | 2.20 | 14.32 (oval) | 22.5 | 1570 | 3010 |
| 15 | Example 1 | Flash Process | 35 × 28 | 2.20 | 14.32 (oval) | 30.6 | 2225 | 2510 |
| 16 | Example 1 | Flash Process + Tempering | 35 × 28 | 2.20 | 14.32 (oval) | 27.7 | 1730 | 2005 |

As shown in Table 4, door beams of 14-16 were prepared to have oval cross-sectional shapes with major axis of 35 mm and minor axis of 28 mm, and to have a thickness of 2.2 mm. During the drop weight tower test, the major axis was oriented parallel to the impact load direction. DTR was determined as a ratio of average of the major (D1) and minor (D2) axis to the thickness (t) of the door beam (D1+D2)/2t (FIG. 5C).

Figure 11:
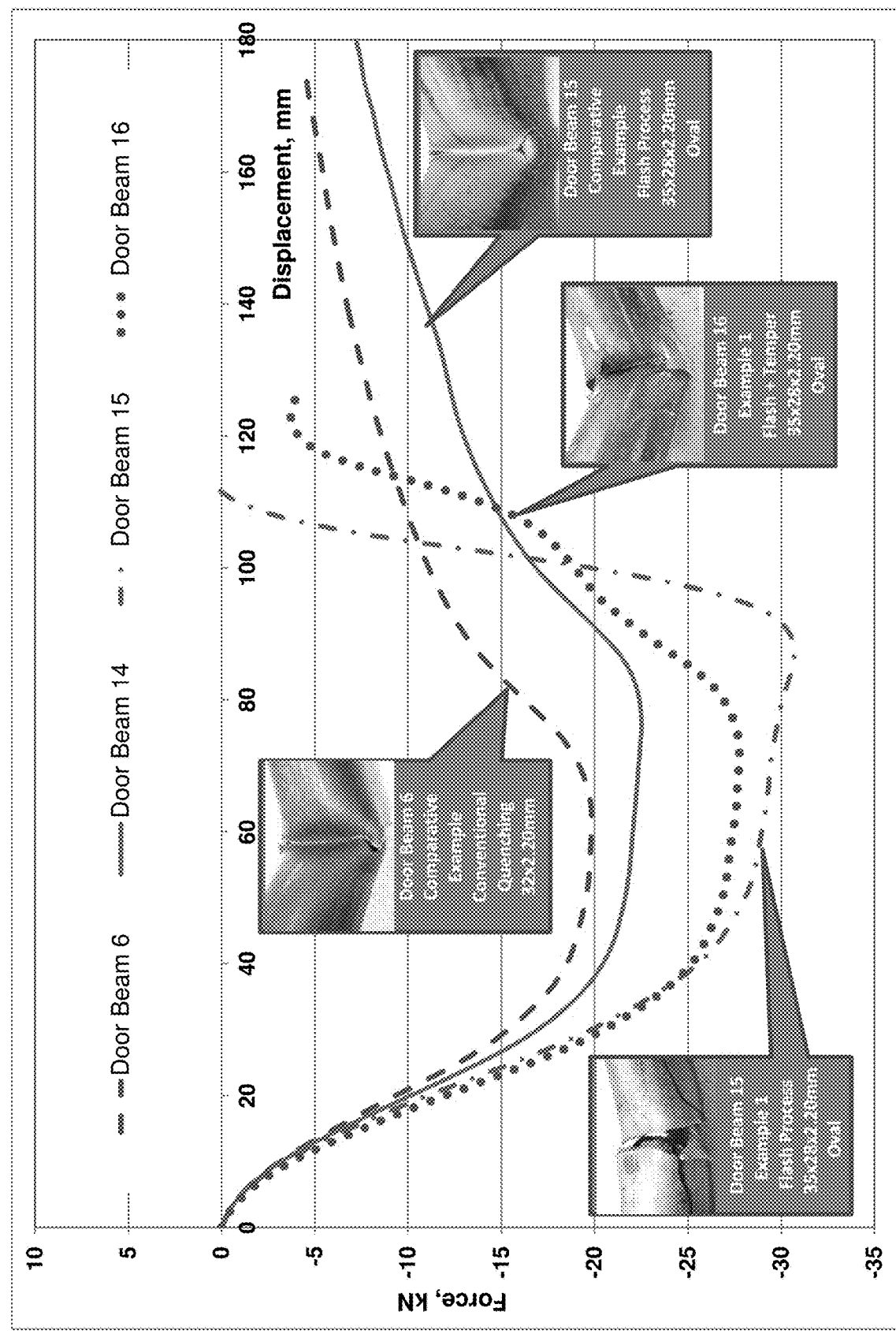
FIG. 11 is a graph of maximum forces upon collision for the various oval-shaped door beams according to exemplary embodiments of the present invention.

The oval door beam 15 produced using the steel composition of Example 1 by the flash process obtained additional and substantial increase in all impact properties compared to the round beams (door beam 9, Table 3, FIG. 11). For instance, at least 5 to 10% improvement in maximum force and 25-35% improvement in energy absorption were obtained for the oval door beam. Further, as compared to the conventional round shaped door beam (door beam 6), maximum force was improved at least by 36%, and total energy absorption was improved at least by about 13%.

Effects on Weight Reduction

Figure 12A:
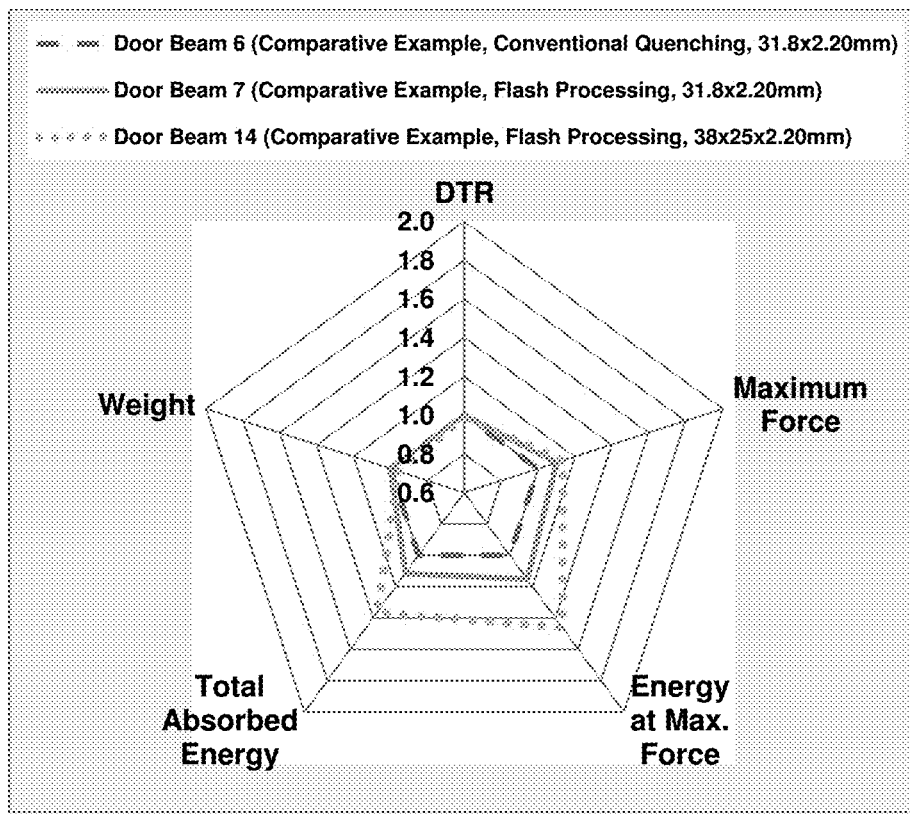
FIG. 12A is a graph showing impact characteristics of a door beam comprising the steel composition of Comparative Example 1 and having DTR of 14.45.
Figure 12B:
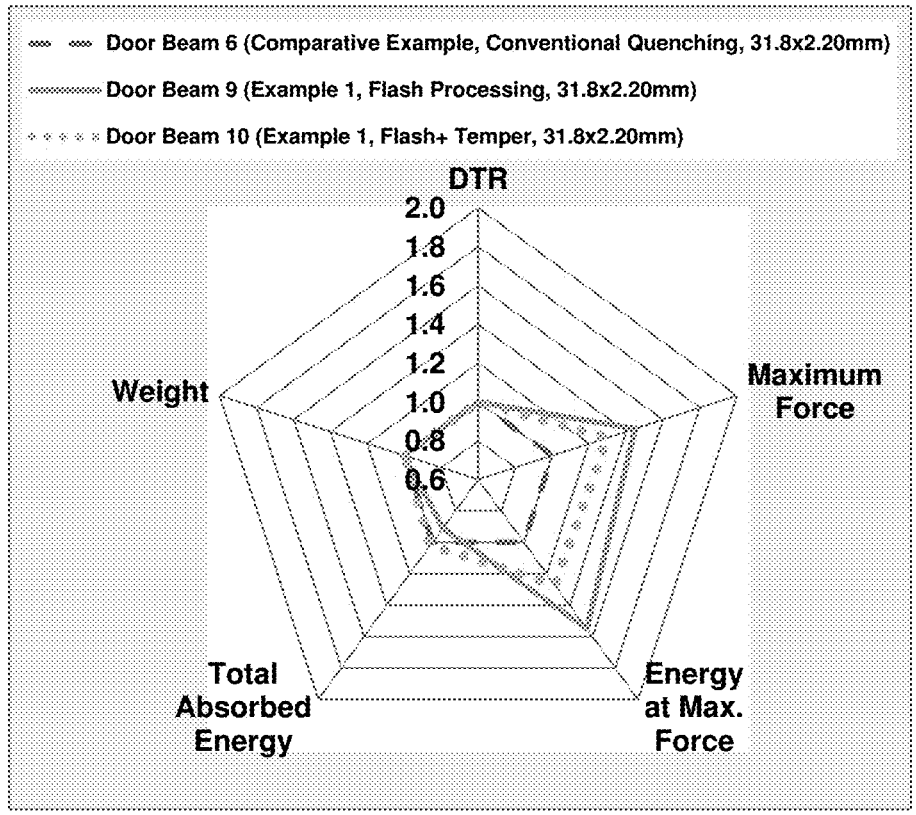
FIG. 12B is a graph showing impact characteristics of an exemplary door beam comprising the steel composition of Example 1 and having DTR of 14.5 according to an exemplary embodiment of the present invention.
Figure 12C:
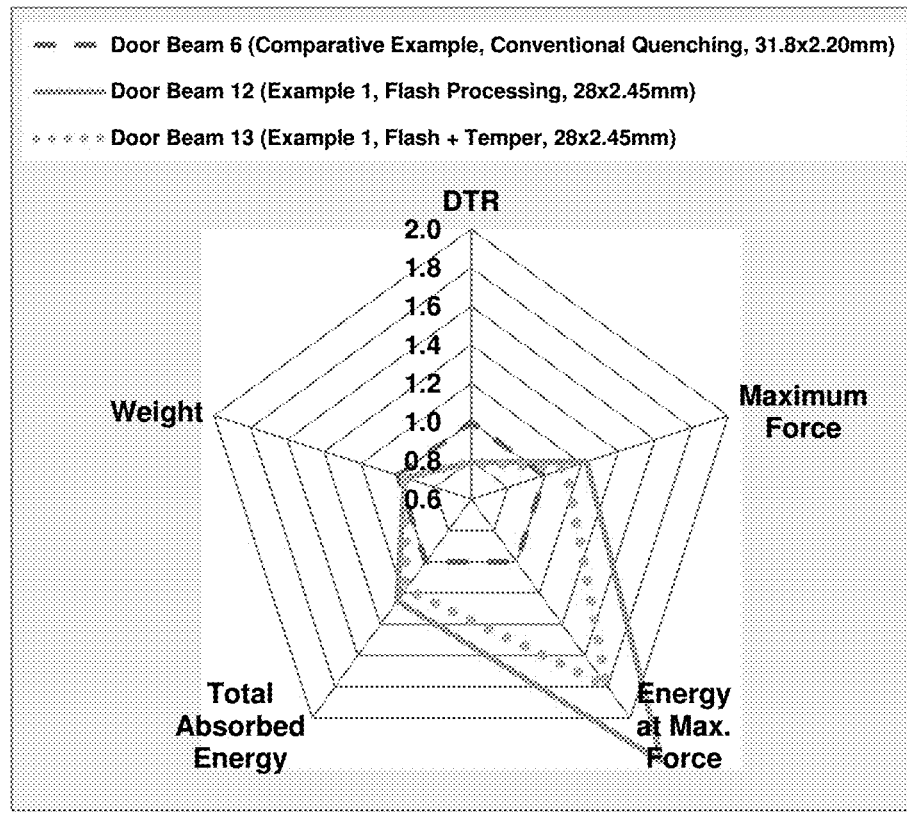
FIG. 12C is a graph showing impact characteristics of an exemplary door beam comprising the steel composition of Example 1 and having DTR of 11.5 according to an exemplary embodiment of the present invention.
Figure 12D:
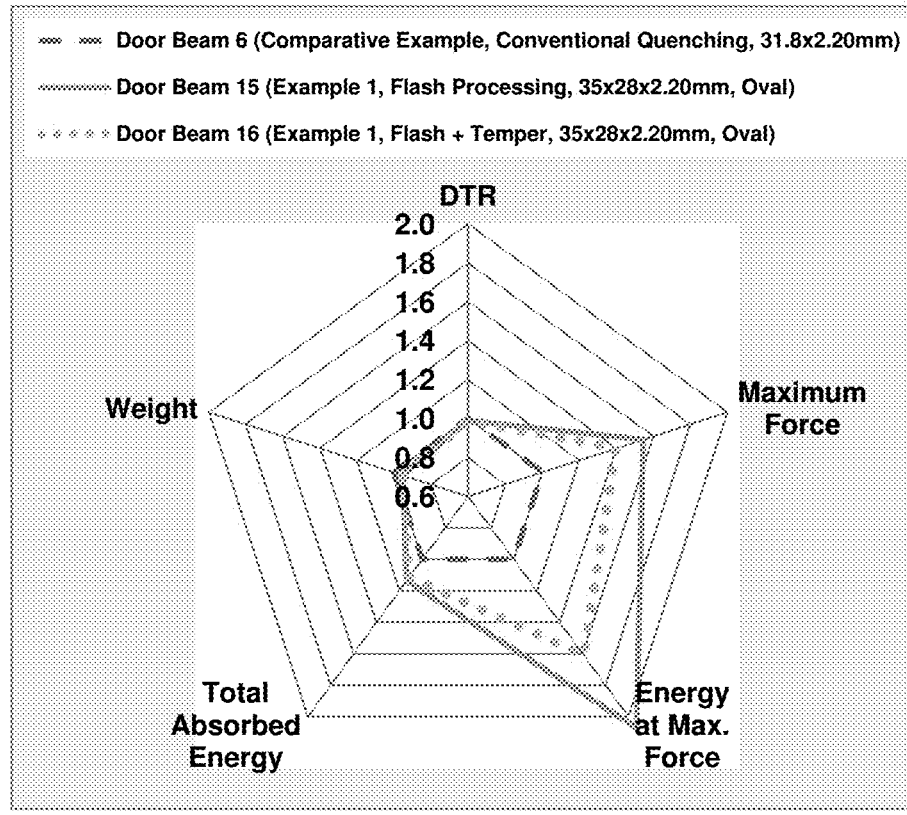
FIG. 12D is a graph showing impact characteristics of an exemplary door beam comprising the steel composition of Example 1 and having oval shape and DTR (major axis) of 14.5 according to an exemplary embodiment of the present invention.

FIGS. 12A-12D are graphs of impact characteristics and weight of door beams according to exemplary embodiments of the present invention. FIG. 12A represents the door beam comprising the steel composition of Comparative Example 1 and having DTR of 14.45, which proposed of 5-10% of weight reduction of the door beam product. FIG. 12B represents the door beam comprising the steel composition of Example 1 and having DTR of 14.5. In particular, with tempering treatment, weight reduction of the door beam product may be of about 10% or greater. FIG. 12C represents the door beam comprising the steel composition of Example 1 and having DTR of 11.5, which generally proposed at least about 10 to 15% weight reduction of the door beam product. FIG. 12D represents the door beam comprising the steel composition of Example 1 and having oval shape and DTR (major axis) of 14.5. With this particular oval shaped door beam, at least about 15 to 20% weight reduction may be obtained.

Figure 13A:
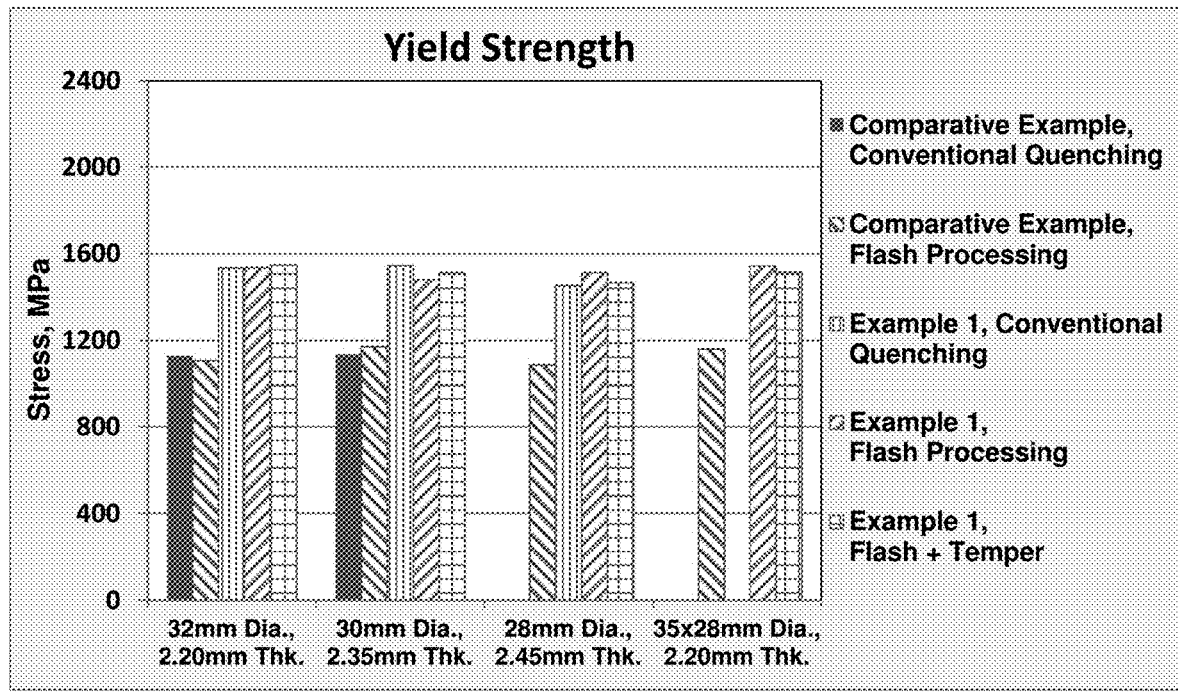
FIG. 13A is a graph showing yield strength of an exemplary door beam comprising the steel composition of Example 1 and having oval shape and DTR (major axis) of 14.5 according to an exemplary embodiment of the present invention.
Figure 13B:
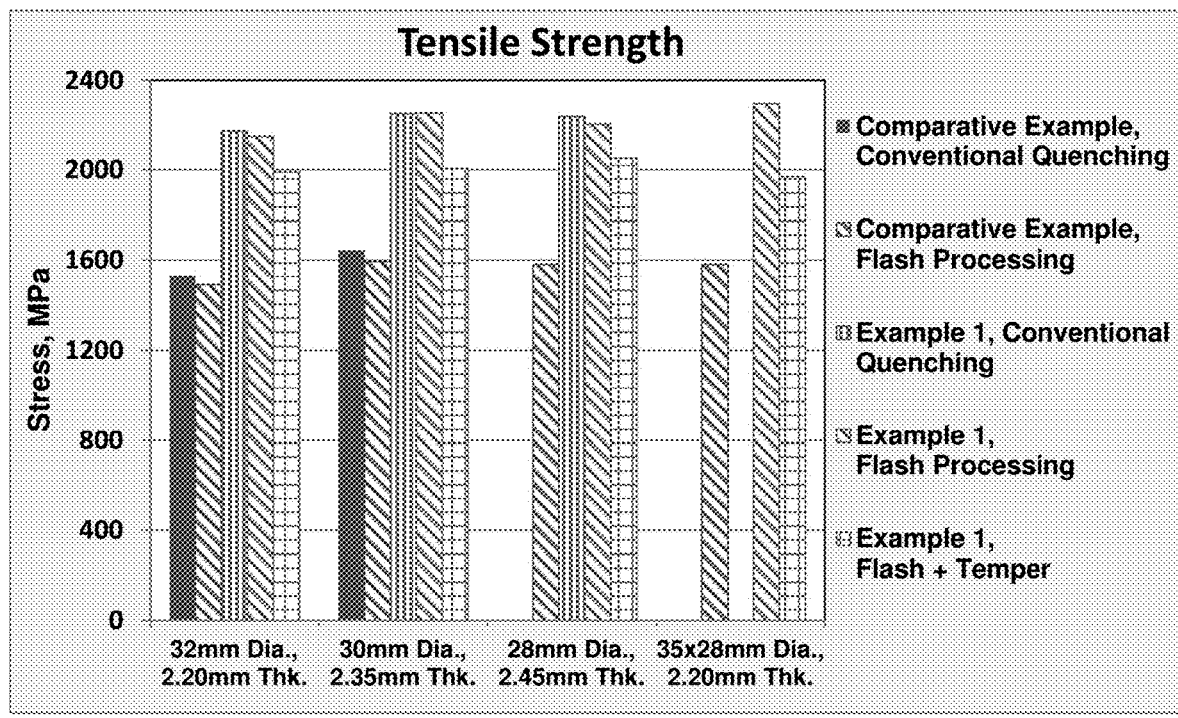
FIG. 13B is a graph showing tensile strength of an exemplary door beam comprising the steel composition of Example 1 and having oval shape and DTR (major axis) of 14.5 according to an exemplary embodiment of the present invention.
Figure 13C:
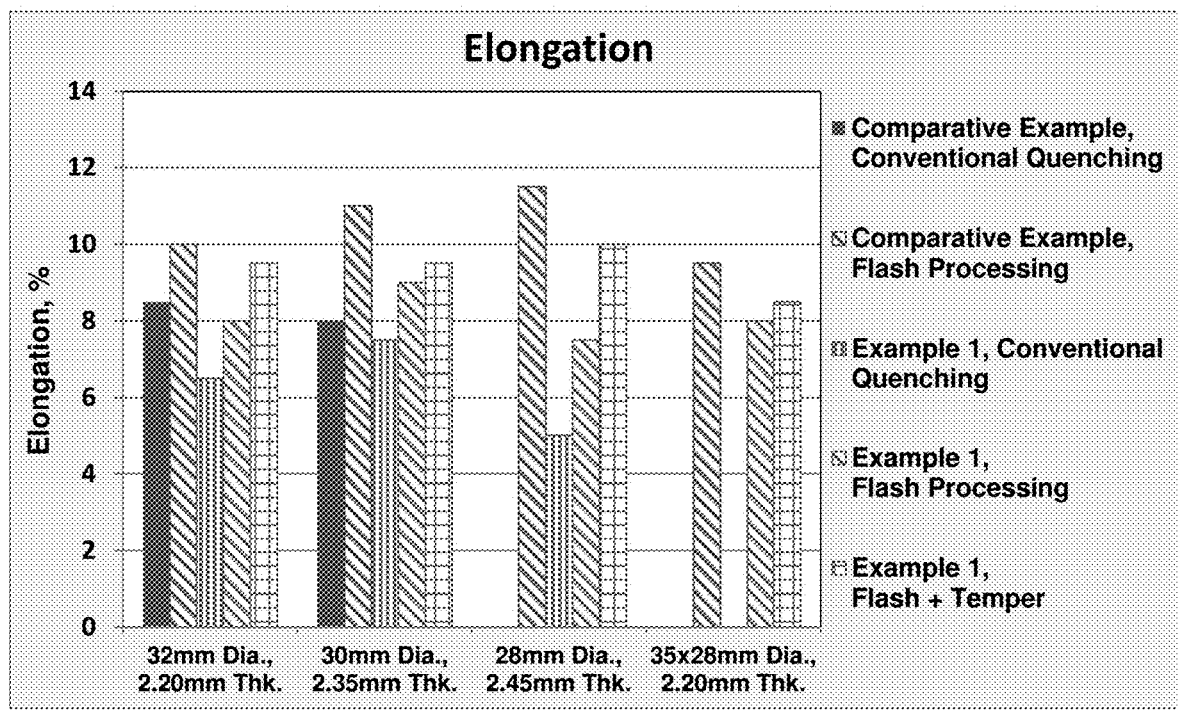
FIG. 13C is a graph showing elongation of an exemplary door beam comprising the steel composition of Example 1 and having oval shape and DTR (major axis) of 14.5 according to an exemplary embodiment of the present invention.

Moreover, FIGS. 13A-13C show mechanical properties (FIG. 13A: yield strength; FIG. 13B: tensile strength and FIG. 13C: elongation) of the door beams, which were prepared in different diameters (e.g. 32 mm, 30 mm, 28 mm or 35×28 mm (oval)), thickness (2.2 mm, 2.35 mm, or 2.45 mm) or shape (e.g. round or oval). The door beams comprising the steel composition of Example 1 according to an exemplary embodiment showed improved mechanical strength, such as yield strength, and tensile strength. Elongation property of the all door beams from the exemplary steel composition were further improved by additional tempering process and as consequence may mitigate brittle fracture of the door beams.

Figure 14:
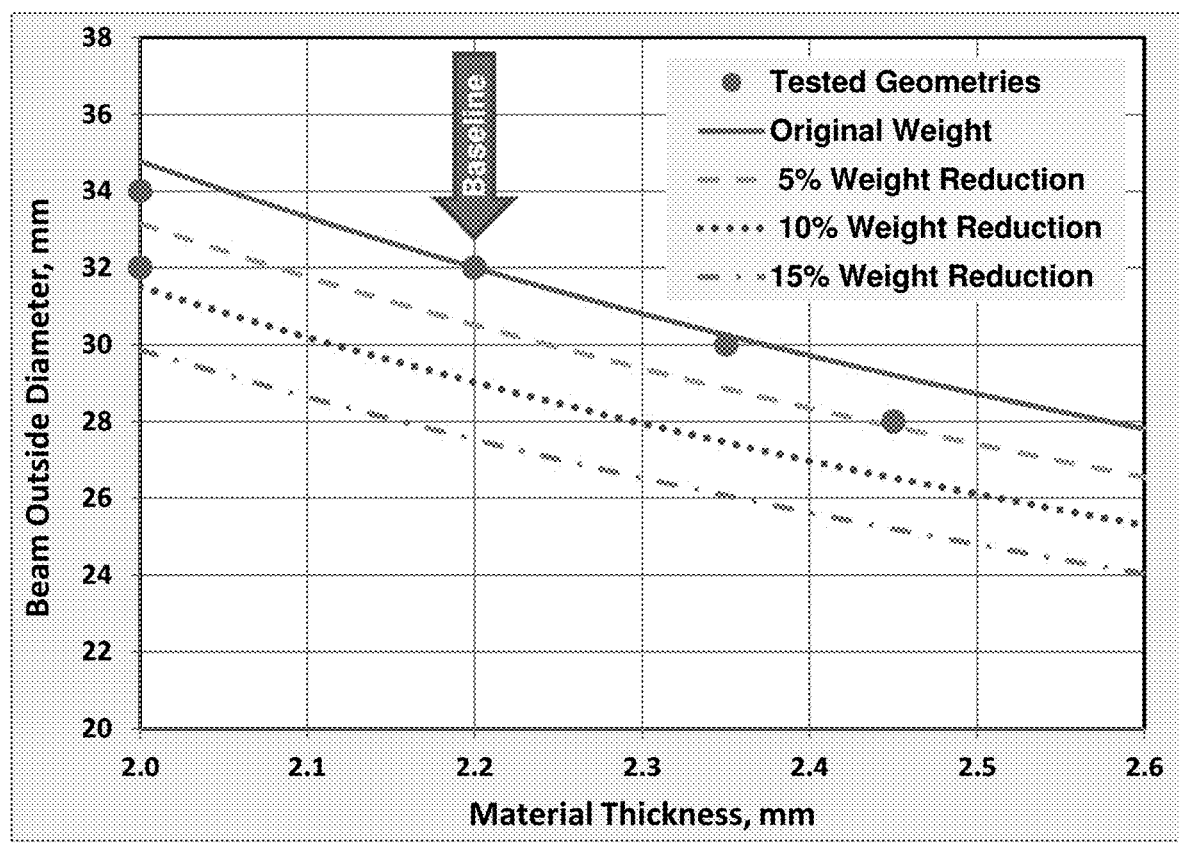
FIG. 14 is a graph showing weight reduction effects based on various geometry factors according to an exemplary embodiment of the present invention.

Table 5 below and FIG. 14 indicate weight reduction effects based on various geometry factors as discussed above such as DTRs (diameter to thickness ratio) beams, diameters and diameters, and shape (round or oval) thereof.

TABLE 5

| Shape | Diameter, mm | Thickness, mm | DTR | Weight, g | Weight Change, % |
|---|---|---|---|---|---|
| Round | 28.0 | 2.45 | 11.4 | 1535 | −3.7 |
| Round | 30.0 | 2.35 | 12.8 | 1600 | +0.3 |
| Round | 31.8 | 2.20 | 14.5 | 1595 | 0 (Current Production) |
| Round | 31.8 | 2.00 | 15.9 | 1452 | −9.0 |
| Round | 34.0 | 2.00 | 17.0 | 1570 | −1.5 |
| Oval | 35 × 28 | 2.20 | N/A | 1520 | −4.7 |

Accordingly, the door beams may be manufactured using the steel compositions according to exemplary embodiments and by flash process and subsequential tempering may reduce the amount of the steel material for satisfying required mechanical properties in these reinforcement parts.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing a boron steel product, comprising:
   pre-heating a steel composition to a first predetermined temperature;
   heat treating, by an induction heating unit, the steel composition to a second predetermined temperature of about 1050 to 1150° C.; and
   cooling, by a cooling unit, the steel composition to a third predetermined temperature of about 10 to 40° C., and wherein the cooling unit decreases the temperature of the steel composition to the third predetermined temperature at a rate greater than about 1000° C./sec,
   wherein a temperature of the steel composition is increased by the induction heating unit to the second predetermined temperature at a rate of about 350 to 400° C./sec and the second predetermined temperature is maintained for less than about 5 seconds,
   wherein the boron steel product is in a tubular form and a cross-section shape of the boron steel product is ring shaped,
   wherein a diameter-to-thickness ratio (DTR) of the boron steel product ranges from 11.4 to 13.0, and
   wherein the steel composition comprises:
   carbon (C) in an amount of about 0.28 to 0.35 wt %;
   manganese (Mn) in an amount of about 1.1 to 1.4 wt %;
   silicon (Si) in an amount of about 0.25 to 0.35 wt %;
   aluminum (Al) in an amount of about 0.03 to 0.04 wt %;
   boron (B) in an amount of about 0.0008 to 0.0012 wt %;
   chromium (Cr) in an amount of about 0.20 to 0.35 wt %;
   titanium (Ti) in an amount of about 0.015 to 0.025 wt %;
   sulfur (S) less than about 0.01 wt %;
   phosphorus (P) less than about 0.015 wt %, and
   iron (Fe) constituting the remaining balance of the steel composition,
   all the wt % is based on the total weight of the steel composition.

2. The method of claim 1, wherein the first predetermined temperature is about 750 to 870° C. and the temperature during the preheating is increased at a rate of about 1 to 100° C./sec.

3. The method of claim 1, comprising tempering the cooled steel composition at a temperature of about 200 to 250° C. for about 3-10 min.

* * * * *